(12) United States Patent
Thiele et al.

(10) Patent No.: US 7,963,587 B2
(45) Date of Patent: Jun. 21, 2011

(54) ATTACHMENTS TO SLIDING DOORS AND VEHICLES INCLUDING SAME

(75) Inventors: Steven R. Thiele, Marysville, OH (US); James Allen Hull, Jr., Marysville, OH (US); Matthew W. Schmitt, Columbus, OH (US)

(73) Assignee: Honda Motor Company, Ltd., Tokyo (JP)

( * ) Notice: Subject to any disclaimer, the term of this patent is extended or adjusted under 35 U.S.C. 154(b) by 229 days.

(21) Appl. No.: 12/464,489

(22) Filed: May 12, 2009

(65) Prior Publication Data

US 2010/0289298 A1 Nov. 18, 2010

(51) Int. Cl.
B60J 5/06 (2006.01)

(52) U.S. Cl. ........................................ 296/155

(58) Field of Classification Search .................. 296/155, 296/146.1, 202, 146.5; 49/502, 118, 504, 49/352, 425, 360; 280/804
See application file for complete search history.

(56) References Cited

U.S. PATENT DOCUMENTS

| | | | |
|---|---|---|---|
| 3,591,983 A | 7/1971 | Hanson | |
| 4,152,872 A * | 5/1979 | Tanizaki et al. | 49/214 |
| 4,413,444 A * | 11/1983 | Chikaraishi | 49/409 |
| 4,621,453 A * | 11/1986 | Watanabe et al. | 49/374 |
| 4,662,109 A * | 5/1987 | Yui et al. | 49/214 |
| 4,964,238 A | 10/1990 | Nishijima et al. | |
| 5,694,719 A | 12/1997 | Bejune et al. | |
| 5,967,595 A * | 10/1999 | Heya et al. | 296/155 |
| 6,390,536 B2 | 5/2002 | Tsubokura et al. | |
| 6,425,208 B1 | 7/2002 | Klueger et al. | |
| 6,550,848 B2 * | 4/2003 | Kleemann | 296/155 |
| 6,698,821 B2 | 3/2004 | Racz | |
| 6,776,450 B2 | 8/2004 | Okubo et al. | |
| 6,779,832 B2 * | 8/2004 | D'Assumcao | 296/155 |
| 6,807,773 B2 | 10/2004 | Cardine et al. | |
| 6,817,804 B2 * | 11/2004 | Le Gallo et al. | 403/408.1 |
| 6,952,898 B2 | 10/2005 | Castellon | |
| 7,159,929 B2 | 1/2007 | Fukushima et al. | |
| 7,261,364 B2 * | 8/2007 | Tanigawa | 296/155 |
| 7,399,023 B2 | 7/2008 | Nomura et al. | |
| 2008/0252098 A1 | 10/2008 | Lange | |
| 2010/0199567 A1 * | 8/2010 | Ishida et al. | 49/360 |

* cited by examiner

Primary Examiner — Kiran B. Patel
(74) Attorney, Agent, or Firm — Ulmer & Berne LLP

(57) ABSTRACT

A sliding door comprises a door structure and a guide rail. The door structure comprises a first surface, a second surface and at least one attachment assembly and defines at least one door aperture extending from the first surface to the second surface. The at least one attachment assembly comprises a first attachment member and a second attachment member. The second attachment member engages the first attachment member and extends through the at least one door aperture having at least a portion of the second attachment member extending beyond the second surface. The guide rail comprises a first contact surface and a second contact surface and defines at least one rail aperture configured to align with the at least one door aperture of the door structure. The second attachment member abuts the second contact surface of the guide rail. Methods of attaching a guide rail to a door structure are also provided herein. Vehicles are also provided.

9 Claims, 3 Drawing Sheets

US 7,963,587 B2

ATTACHMENTS TO SLIDING DOORS AND VEHICLES INCLUDING SAME

TECHNICAL FIELD

The present invention relates to attachments to sliding doors and vehicles including the same.

BACKGROUND

Some conventional minivans are provided with a sliding rear side door which facilitates selective ingress and egress of cargo and/or passengers through an access opening and with respect to a passenger compartment of the minivan.

SUMMARY

In accordance with one embodiment, a sliding door comprises a door structure, a guide rail and at least one fastener. The door structure comprises a first surface, a second surface and at least one attachment assembly and defines at least one door aperture extending from the first surface to the second surface. The at least one attachment assembly comprises a first attachment member and a second attachment member. The first attachment member comprises an internal surface and is fixedly attached to the first surface. The second attachment member engages the internal surface of the first attachment member and extends through the at least one door aperture having at least a portion of the second attachment member extending beyond the second surface. The guide rail comprises a first contact surface and a second contact surface and defines at least one rail aperture configured to align with the at least one door aperture of the door structure. The second attachment member abuts the second contact surface of the guide rail. The at least one fastener comprises a head and a shank. The shank extends through both the at least one rail aperture and the at least one door aperture and is configured to engage the second attachment member. The head of the fastener abuts the first contact surface of the guide rail.

In accordance with another embodiment, a method of attaching a guide rail to a door structure for a sliding door of a vehicle comprises providing a door structure, adjusting the position of a second attachment member, aligning a guide rail with the door structure, and attaching the guide rail to the door structure with at least one fastener. The door structure comprises a first surface, a second surface and at least one attachment assembly and defines at least one door aperture extending from the first surface to the second surface. The at least one attachment assembly comprises a first attachment member and a second attachment member. The first attachment member comprises an internal surface and is fixedly attached to the first surface. The second attachment member engages the internal surface of the first attachment member and extends through the at least one door aperture. The position of the second attachment member is adjusted relative to the first attachment member such that at least a portion of the second attachment member extends beyond the second surface. The guide rail comprises a first contact surface and a second contact surface and defines at least one rail aperture configured to align with the at least one door aperture of the door structure. The second attachment member abuts the second contact surface of the guide rail. The at least one fastener comprises a head and a shank. The shank extends through both the at least one rail aperture and the at least one door aperture and engages the second attachment member. The head of the fastener abuts the first contact surface of the guide rail.

In accordance with yet another embodiment, a vehicle comprises a body structure and a sliding door movable with respect to the body structure between closed and opened positions. The sliding door comprises a door structure, a guide rail and at least one fastener. The door structure comprises a first surface, a second surface and at least one attachment assembly and defines at least one door aperture extending from the first surface to the second surface. The at least one attachment assembly comprises a first attachment member and a second attachment member. The first attachment member comprises an internal surface and is fixedly attached to the first surface. The second attachment member engages the internal surface of the first attachment member and extends through the at least one door aperture having at least a portion of the second attachment member extending beyond the second surface. The guide rail comprises a first contact surface and a second contact surface and defines at least one rail aperture configured to align with the at least one door aperture of the door structure. The second attachment member abuts the second contact surface of the guide rail. The at least one fastener comprises a head and a shank. The shank extends through both the at least one rail aperture and the at least one door aperture and is configured to engage the second attachment member. The head of the fastener abuts the first contact surface of the guide rail.

In accordance with still another embodiment, a sliding door comprises a door structure and a guide rail. The door structure comprises a first surface, a second surface and at least one attachment assembly and defines at least one door aperture extending from the first surface to the second surface. The at least one attachment assembly comprises a first attachment member and a second attachment member. The first attachment member comprises an internal surface and is fixedly attached to the first surface. The second attachment member engages the internal surface of the first attachment member and extends through the at least one door aperture having at least a portion of the second attachment member extending beyond the second surface. The guide rail comprises a first contact surface and a second contact surface and defines at least one rail aperture configured to align with the at least one door aperture of the door structure. The second attachment member abuts the second contact surface of the guide rail such that the guide rail and the door structure are spaced away from each other.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
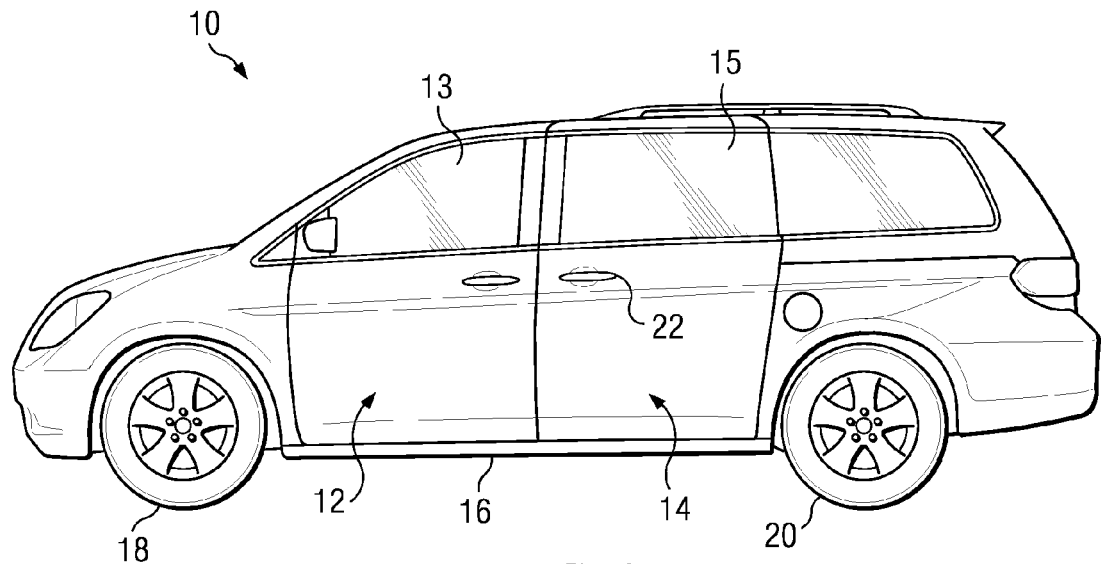
FIG. 1 is a left side elevational view depicting a minivan in accordance with one embodiment, wherein a left sliding rear side door is in a closed position.
Figure 2:
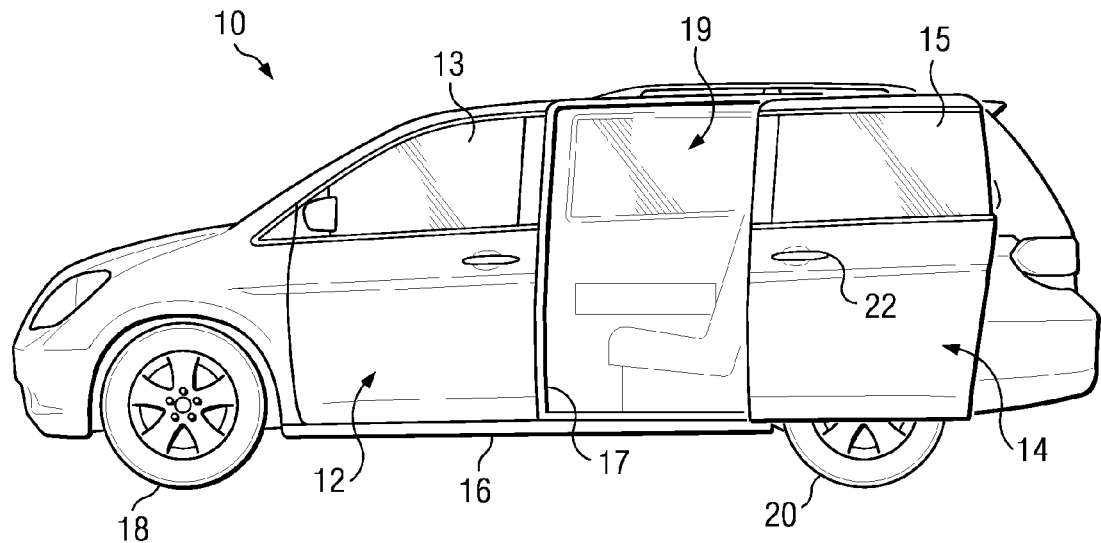
FIG. 2 is a left side elevational view depicting the minivan of FIG. 1, wherein the left sliding rear side door is in an opened position.

Select embodiments are hereinafter described in detail in connection with the views and examples of FIGS. 1-7. A vehicle can be provided with a sliding door with respect to a body structure of the vehicle. In one embodiment, the vehicle can comprise a van, such as of a type which is often referred to as a minivan, an example of which is shown in FIGS. 1-2. However, in other embodiments, the vehicle can comprise an automobile, a truck, a bus, and/or any of a variety of other types of vans or other vehicles which include at least one sliding door.

A vehicle 10 is shown in FIGS. 1-2 to comprise a driver door 12 and a sliding door 14 which are each moveably attached to a body structure 16 of the vehicle 10. The body structure 16 can comprise frame members, body members, and/or other components that generally define the shell of the vehicle 10. In one embodiment, the body structure 16 can comprise a unibody-type structure. In other embodiments, the body structure 16 can comprise multiple body panels welded to an underlying frame structure. The body structure 16 can define a passenger compartment (shown as 19 in FIG. 2) which is configured to support and hold people and/or cargo during use of the vehicle 10.

While the driver door 12 can be hingedly attached to the body structure 16 to facilitate access to, and egress from, the passenger compartment 19 by a driver of the vehicle 10, it will be appreciated that the sliding door 14 can be slideably attached to the body structure 16 to facilitate access to, and egress from, the passenger compartment 19 of cargo and/or a passenger of the vehicle 10, as discussed in further detail below. The driver door 12 is shown to comprise a window 13, and the sliding door 14 is shown to comprise a window 15, although it will be appreciated that such doors might alternatively not include windows. It will also be appreciated that a similar arrangement of doors can be provided upon the opposite side of the vehicle 10. In another embodiment, it will be appreciated that a vehicle might alternatively include only a single sliding door oriented upon either the left side or right side of the vehicle. It will also be appreciated that a sliding door can be provided in any of a variety of suitable locations upon other types of vehicles. Also, while the driver door 12 is shown in FIG. 1 to be provided on a left side of the vehicle 10, it will be appreciated that a driver door can alternatively be provided upon a right side of a vehicle.

The vehicle 10 can comprise front wheels (e.g., 18) and rear wheels (e.g., 20) which are rotatably supported with respect to the body structure 16. The front wheels (e.g., 18) are generally steerable by a driver of the vehicle 10 to facilitate steering of the vehicle 10. At least one of the front wheels (e.g., 18) and/or the rear wheels (e.g., 20) can be coupled to a source of motive power such as, for example, an engine and/or electric motor (not shown) to facilitate propulsion of the vehicle 10. It will be appreciated that, as the vehicle 10 travels along the ground, the rear wheels (e.g., 20) can rotate about a rotational axis with respect to the body structure 16.

The sliding door 14 is shown to comprise a left sliding rear side door of the vehicle 10. The body structure 16 can define an access opening 17 to the passenger compartment 19, as shown in FIG. 2. The sliding door 14 can be movable with respect to the body structure 16 between closed and opened positions, as shown in FIGS. 1 and 2, respectively. When the sliding door 14 is in the closed position (shown in FIG. 1), the sliding door 14 can prevent passage of cargo and/or a passenger through the access opening 17. However, when the sliding door 14 is in an opened position, the sliding door 14 can facilitate passage of cargo and/or a passenger through the access opening 17. While the sliding door 14 is shown to be in a fully opened position in FIG. 2, it will be appreciated that the sliding door 14 can alternatively assume other opened positions (i.e., partially opened positions) which can facilitate passage of cargo and/or a passenger through the access opening 17.

The sliding door 14 is shown in FIGS. 1-2 to include an exterior handle 22 to facilitate manual sliding of the sliding door 14 between closed and opened positions by a person on the exterior of the vehicle 10. The sliding door 14 might additionally or alternatively include a similar handle (not shown) attached to an interior portion of the sliding door 14 to facilitate manual sliding of the sliding door 14 between closed and opened positions by a passenger within the passenger compartment 19 of the vehicle 10. Additionally or alternatively, a power actuator (e.g., including an electric motor and gearing) might be associated with the sliding door 14 to facilitate powered sliding of the sliding door 14 between closed and opened positions as directed by a driver or passenger of the vehicle 10.

Any of a variety of suitable sliding mechanisms can be provided to facilitate attachment of a sliding door to a body structure of a vehicle such that the sliding door is movable with respect to the body structure between closed and opened positions.

In the embodiment of FIGS. 1-5, the vehicle 10 is shown to include a guide rail 30 which can be attached to the door structure 26 of a sliding door 14 such as with welding, fasteners, and/or adhesives. It will be appreciated that part or all of the guide rail 30 can be formed as a unitary member.

Figure 3:
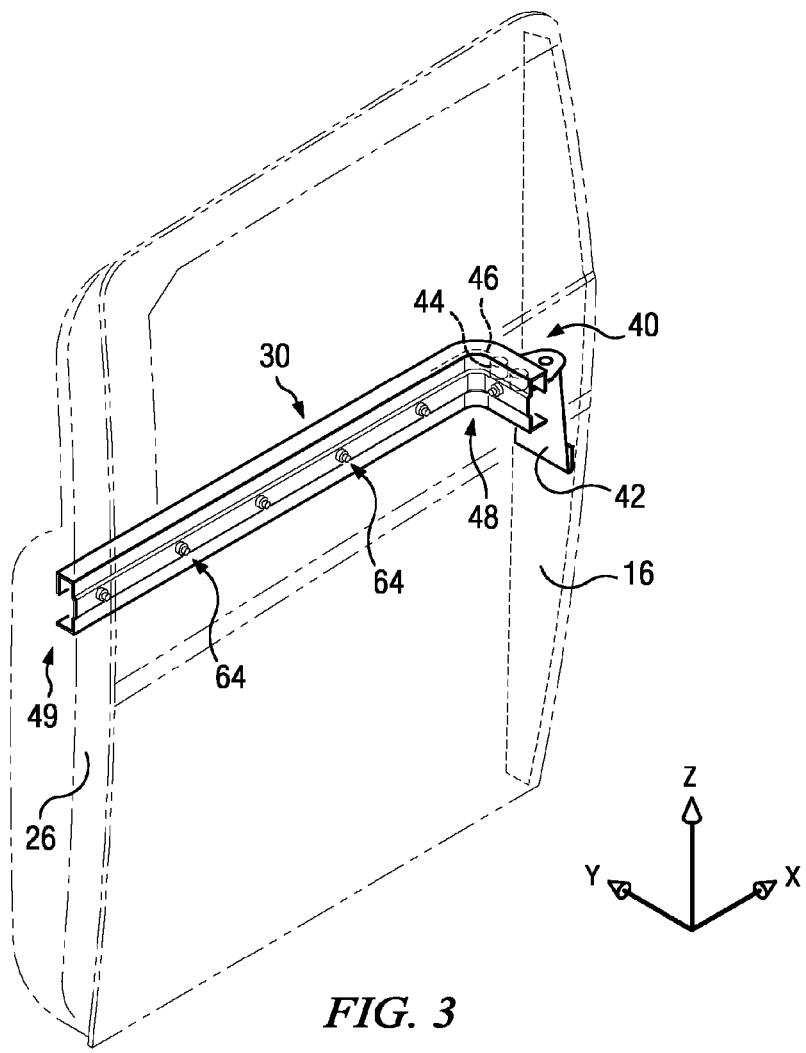
FIG. 3 is an enlarged perspective view depicting the left sliding rear side door and the associated guide rail removed from the minivan of FIG. 1, wherein the left sliding rear side door is shown in dashed lines for clarity of illustration.

With reference to the X-axis, the Y-axis, and the Z-axis shown in FIG. 3, it will be appreciated that the X-axis can be directed generally fore-aft along the vehicle 10, the Y-axis can be directed generally laterally or side-to-side along the vehicle 10, and the Z-axis can be directed generally up-down or vertically along the vehicle 10.

A roller assembly 40 can also be movably engaged with the guide rail 30 as the sliding door 14 moves between the closed (FIG. 1) and opened (FIG. 2) positions. For example, the roller assembly 40 can comprise a bracket 42 and one or more wheels or disks (e.g., 44, 45 in FIGS. 3-4) which can be rotatably attached to the bracket 42 and each include a circumferential surface 47 which can contact one or more engagement surfaces (e.g., 46) provided by the guide rail 30 as the sliding door 14 moves between the closed (FIG. 1) and opened (FIG. 2) positions. In one embodiment, to facilitate smooth sliding movement of the sliding door 14 with respect to the body structure 16, a sliding mechanism can be configured such that this contact can be continuous as the sliding door 14 moves between the closed (FIG. 1) and opened (FIG. 2) positions. It will be appreciated that a roller assembly can contact and engage a guide rail in any of a variety of other suitable arrangements and/or configurations.

Figure 4:
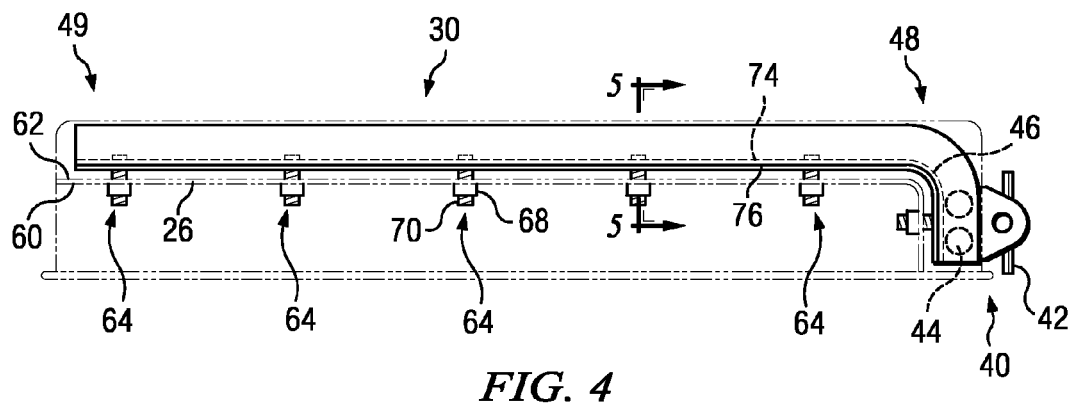
FIG. 4 is an enlarged top plan view depicting the left sliding rear side door and associated guide rail of FIG. 3, wherein certain hidden surfaces of the guide rail are shown in dashed lines.

In one embodiment, with reference to FIGS. 3-4, an engagement surface (e.g., 46) of the guide rail 30 can define a pathway as one or more wheels and/or disks (e.g., 44) can roll along in contact with the engagement surface as the sliding door 14 moves between closed (see FIG. 1) and opened positions (see FIG. 2). It will be appreciated that one or more different portions of a guide rail can define a pathway for movement of a roller assembly depending, of course, upon the configuration and arrangement of the engagement between the roller member and the guide rail.

The guide rail 30 shown in FIGS. 3-4 can extend between first and second ends 48 and 49. When the sliding door 14 is in the closed position (see FIG. 1), wheels or disks (e.g., 44) can contact an engagement surface (e.g., 46) of the guide rail 30 near the first end 48. When the sliding door 14 is in the opened position (see FIG. 2), wheels or disks (e.g., 44) can contact an engagement surface (e.g., 46) of the guide rail 30 near the second end 49.

Figure 5:
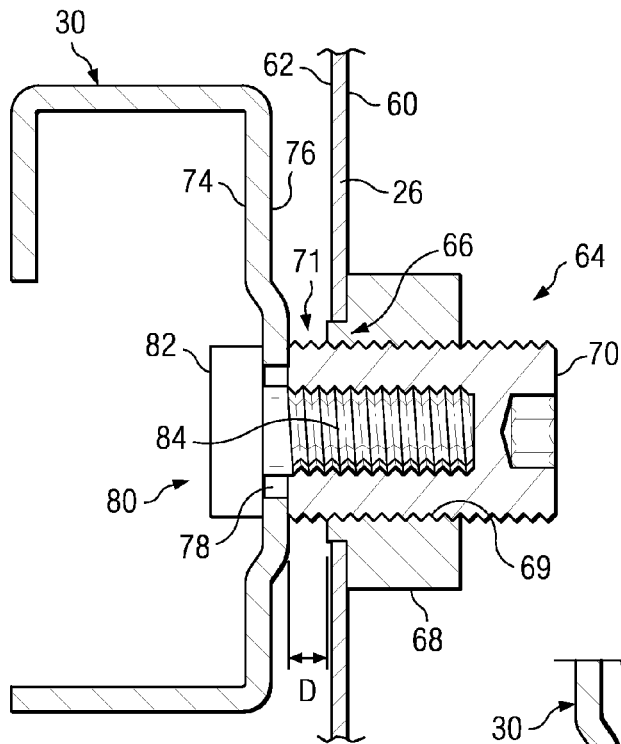
FIG. 5 is an enlarged cross-sectional view taken along line 5-5 in FIG. 4.

The sliding door 14 can include the door structure 26. The door structure 26 (as shown in FIGS. 3-5) can include a first surface 60, a second surface 62 and at least one attachment assembly 64. The door structure 26 can also define at least one door aperture (e.g., 66) extending from the first surface 60 to the second surface 62, which is more clearly illustrated in FIG. 5. In one embodiment, the door structure 26 can have a plurality of door apertures. The attachment assembly 64 can include a first attachment member 68 (e.g., a nut) and a second attachment member 70 (e.g., a collar). The first attachment member 68 can be fixedly attached to the first surface 60 of the door structure 26. For example, the first attachment member 68 can be welded to the door structure 26. However, it will be appreciated by one skilled in the art that a first attachment member can be fixedly attached to a door structure by a variety of suitable methods. The first attachment member 68 can also have an internal surface 69, wherein in one embodiment, the internal surface 69 can be threaded.

Figure 6:
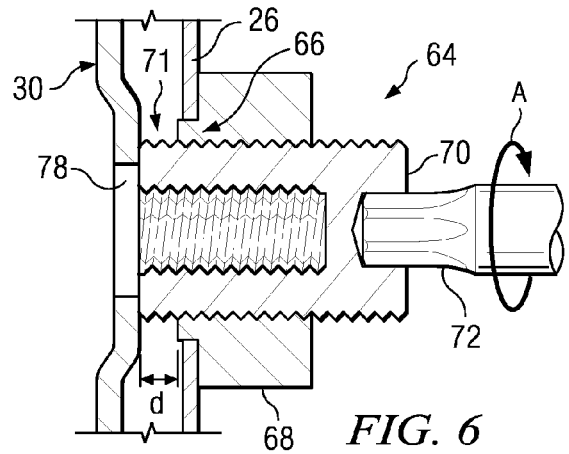
FIG. 6 is a cross-sectional view similar to FIG. 5, but with the fastener omitted, illustrating an attachment of a threaded collar.

The second attachment member 70 can engage the internal surface 69 of the first attachment member 68. In addition, the second attachment member 70 can extend through the door aperture (e.g., 66) having at least a portion (e.g., a first end 71) of the second attachment member 70 extending beyond the second surface 62 of the door structure 26. In one embodiment, the second attachment member 70 can be engaged to the first attachment member 68 such that the position of the second attachment member 70 can be adjusted relative to the first attachment member 68 such that the first end 71 of the second attachment member 70 can extend beyond the second surface 62 of the door structure 26 by a predetermined distance (D) (see FIG. 5). The second attachment member 70 (e.g., threaded collar) can be threadably engaged with the first attachment member 68 by using a torque device (e.g., a screw driver 72) having a rotation force (A), as illustrated in FIG. 6. The predetermined distance (D) can provide spacing between the door structure 26 and the guide rail 30 once attached. Allowing the position of the second attachment member 70 to be adjustable relative to the first attachment member 68 provides a user flexibility with respect to how far the first end 71 of the second attachment member 70 (e.g., threaded collar) extends beyond the second surface 62 of the door structure 26. Due to tolerance limitations and other factors from manufacturing having the ability to vary the distance or amount that a second attachment member extends beyond a second surface of a door structure can be beneficial for purposes of construction.

Figure 7:
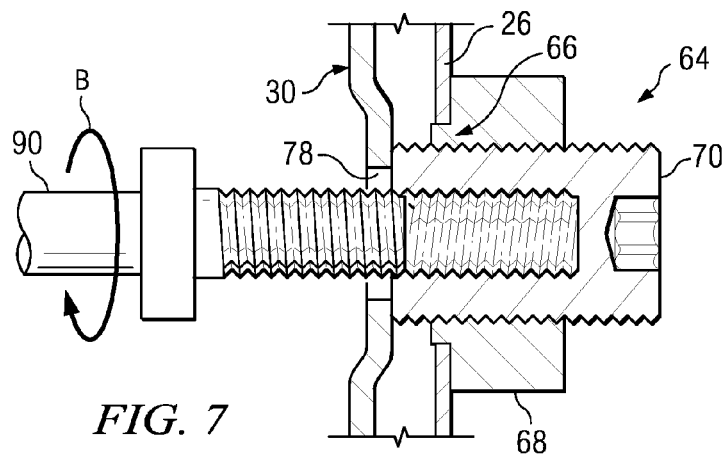
FIG. 7 is a cross-sectional similar to FIG. 5, but with the fastener not engaged, illustrating an attachment of a fastener.

The guide rail 30 can include a first contact surface 74 and a second contact surface 76 and define at least one rail aperture (e.g., 78) (which is illustrated in FIGS. 5-7). The rail aperture (e.g., 78) can be configured to align with the door aperture (e.g., 66) of the door structure 26. Once these apertures (e.g., 66, 78) are aligned the guide rail 30 can be effectively attached to the door structure 26. In one embodiment, a guide rail can have a plurality of rail apertures. The second attachment member 70 can be adjusted relative to the first attachment member 68 until the first end 71 abuts the second contact surface 76 of the guide rail 30, as illustrated in FIG. 5. Again, this distance between the second contact surface 76 of the guide rail 30 and second surface 62 of the door structure 26 can be a predetermined distance (D). However, due to variability in manufactured parts a predetermined distance can change (e.g., "d" see FIG. 6) at each connection point adjoining a guide rail to a door structure. The ability to adjust the second attachment member 70 relative to the first attachment member 68 can provide substantial versatility to a user when attaching the guide rail 30 to the door structure 26.

Once the second contact surface 76 of the guide rail 30 contacts the second attachment member 70 the guide rail 30 and door structure 26 can be attached by a fastener 80 (e.g., a bolt) as illustrated in FIG. 5. The fastener 80 can include a head 82 and a shank 84. As shown in FIG. 5, the shank 84 can extend through both a rail aperture (e.g., 78) and a door aperture (e.g., 66). Once the fastener 80 extends through the substantially aligned apertures (e.g., 66, 78), the fastener 80 can engage the second attachment member 70. The fastener 80 can be engaged with the second attachment member 70 until the head 82 of the fastener 80 contacts the first contact surface 74 of the guide rail 30 (see FIGS. 5 and 7). As illustrated in FIG. 7, the fastener 80 (e.g., threaded bolt) can be threadably engaged with the second attachment member 70 (e.g., threaded collar) by using a torque device (e.g., screw driver 90) having a rotational force (B).

Prior to attaching the guide rail 30 and the door structure 26 with the fastener 80, the guide rail 30 can be adjusted to properly align with the door structure 26. For example, the rail aperture (e.g., 78) of the guide rail 30 can include a slot (see FIGS. 5-7). The slot can allow the guide rail 30 to move among at least two positions providing additional flexibility when attaching the guide rail 30 to the door structure 26. For example, the slot can be oriented along the X-axis or the Z-axis. However, it will be appreciated that a slot could be designed to have a variety of orientations and/or configurations along any of a variety of axes to provide sufficient versatility when attaching and/or disassembling a guide rail and door structure.

The foregoing description of embodiments and examples of the invention has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate the principles of the invention and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A sliding door comprising:
a door structure comprising a first surface, a second surface and at least one attachment assembly and defining at least one door aperture extending from the first surface to the second surface, wherein the at least one attachment assembly comprises a first attachment member and a second attachment member, wherein the first attachment member comprises an internal surface and is fixedly attached to the first surface and the second attachment member engages the internal surface of the first attachment member and extends through the at least one door aperture and having at least a portion of the second attachment member extending beyond the second surface;

a guide rail comprising a first contact surface and a second contact surface and defining at least one rail aperture configured to align with the at least one door aperture of the door structure, wherein the second attachment member abuts the second contact surface of the guide rail; and at least one fastener comprising a head and a shank, wherein the shank extends through both the at least one rail aperture and the at least one door aperture and is configured to engage the second attachment member, wherein the head of the fastener abuts the first contact surface of the guide rail.

2. The sliding door of claim 1, wherein the first attachment member comprises a nut welded to the first surface of the door structure.

3. The sliding door of claim 1, wherein the second attachment member comprises a threaded collar.

4. The sliding door of claim 1, wherein the door structure comprises a plurality of attachment assemblies.

5. The sliding door of claim 4, wherein the sliding door comprises a plurality of fasteners.

6. The sliding door of claim 1, wherein the at least one fastener comprises a bolt.

7. The sliding door of claim 1, wherein the door structure and the guide rail are spaced away from each other.

8. The sliding door of claim 1, wherein the at least one rail aperture comprises a slot such that the guide rail can be adjusted with respect to the fastener.

9. The sliding door of claim 8, wherein the guide rail can be adjusted among at least two positions with respect to the at least one fastener.

* * * * *